United States Patent
Noguchi et al.

[15] 3,642,579
[45] Feb. 15, 1972

[54] PROCESS FOR PRODUCING L-PROLINE

[72] Inventors: Yuichi Noguchi; Junichi Nakajima; Tetsuo Uno; Kazumi Araki, all of Hofu-shi, Japan

[73] Assignee: Kyowa Hakko Kogyo Co., Ltd., Tokyo, Japan

[22] Filed: July 12, 1968

[21] Appl. No.: 744,294

Related U.S. Application Data

[63] Continuation of Ser. No. 531,775, Mar. 4, 1966, abandoned.

[30] Foreign Application Priority Data

Mar. 6, 1965 Japan..................................40/12692

[52] U.S. Cl...................................................195/29
[51] Int. Cl....................................................C12d 13/06
[58] Field of Search.......................................195/29, 47

[56] References Cited

UNITED STATES PATENTS

| | | |
|---|---|---|
| 2,988,489 | 6/1961 | Kinoshita et al..........................195/47 |
| 3,189,526 | 6/1965 | Kinoshita et al..........................195/29 |
| 3,329,577 | 7/1967 | Okumura et al..........................195/29 |

*Primary Examiner*—Lionel M. Shapiro
*Attorney*—Craig, Antonelli, Stewart & Hill

[57] ABSTRACT

A process for producing L-proline by fermentation which comprises culturing a strain of *Micrococcus glutamicus* which requires isoleucine, arginine, citrulline, orithine, methionine or vitamin $B_{12}$ for its growth in an aqueous nutrient medium under aerobic conditions. The addition of at least 0.4 percent by weight of magnesium sulfate to the medium greatly improves the yield of L-proline.

9 Claims, No Drawings

PROCESS FOR PRODUCING L-PROLINE

CROSS-REFERENCE TO RELATED APPLICATION

This application is a continuation of copending application Ser. No. 531,775, filed on Mar. 4, 1966, now abandoned.

This invention relates to a process for producing L-proline. More particularly, it relates to a process for the production of L-proline by fermentation. Even more particularly, the invention relates to a process for the production of L-proline by fermentation with micro-organisms which require isoleucine, arginine, citrulline, ornithine, methionine or vitamin $B_{12}$ for their growth.

L-proline is a useful amino acid which is used as a medicine and in other applications. Heretofore, L-proline has mainly been produced by isolation from hydrolysates of proteins or gelatin or by organic synthesis. However, the yield of product obtained by these methods is very low, and the procedures involved are complicated. Consequently, L-proline is one of the most expensive amino acids. Therefore, the development of a process for the mass production of L-proline by fermentation using inexpensive carbohydrate starting materials has long been sought, but nothing has been reported in the literature with respect to an industrial process for producing L-proline by fermentation. In this regard, one report [Amino Acid, Volume 8, 51 (1963)] indicates that only a slight amount—73γ/l.—of L-proline is accumulated in the culture liquor when Micrococcus glutamicus strain No. 541 is cultivated with the object of obtaining L-proline.

One of the objects of the present invention is to provide an improved process for the preparation of L-proline which overcomes the disadvantages and deficiencies of the prior art methods.

Another object of the present invention is to provide a process for producing L-proline by fermentation which may be carried out in an efficacious and simple manner.

A further object of the invention is to provide a process for preparing L-proline by fermentation which gives the product in high purity and good yield.

A still further object of the invention is to provide a process for producing L-proline by fermentation which may be carried out advantageously on an industrial scale to give a high yield of product.

These and other objects and advantages of the present invention will become apparent to those skilled in the art from a consideration of the following specification and claims.

In accordance with the present invention, it has been found that the above-mentioned objects and advantages may be achieved if certain mutant micro-organisms which require isoleucine, arginine, citrulline, ornithine, methionine or vitamin $B_{12}$ for their growth are cultivated in a culture medium which contains a carbon source, a nitrogen source, inorganic substances and small amounts of nutrients. In this way, a remarkable accumulation of L-proline of more than about 8–10 mg./ml. is obtained.

Strains which have been found to be particularly suitable in the process of the present invention include, for example, Micrococcus glutamicus ATCC No. 19,223 (requiring isoleucine), Micrococcus glutamicus ATCC No. 19,224 (requiring arginine, citrulline or ornithine) and Micrococcus glutamicus ATCC No. 19,225 (requiring methionine or vitamin $B_{12}$). Of course, other micro-organisms which display these particular growth requirements may be employed.

The bacteriological properties of Micrococcus glutamicus are described in U.S. Pat. No. 3,003,925 and in the Bulletin of the Agricultural Chemical Society of Japan, Volume 22, No. 3, 176–185. The particular above-mentioned strains are mutants thereof which are obtained by ultraviolet irradiation; all of them differ from the parent strains in requiring isoleucine (Micrococcus glutamicus ATCC No. 19,223); arginine, citrulline or ornithine (Micrococcus glutamicus ATCC No. 19,224), and methionine or vitamin $B_{12}$ (Micrococcus glutamicus ATCC No. 19,225) for their growth as well as in producing L-proline as their main product.

As for the composition of the culture medium, either a synthetic or a natural organic culture medium is suitable as long as it contains the essential nutrients for the growth of the micro-organism employed. Such nutrients are well known in the art and include substances such as a carbon source, a nitrogen source, inorganic compounds and nutrients which are utilized by the bacterium employed in appropriate amounts. Thus, as a carbon source, there may be mentioned, by way of example, a carbohydrates such as glucose, fructose, mannose, galactose, sucrose, maltose, lactose, trehalose, cellobiose, raffinose, arabinose, mannitol, sorbitol, inositol, xylose as well as starch hydrolysate, waste molasses and the like. Mixtures of two or more of these substances may be employed. As a nitrogen source, various kinds of inorganic or organic salts or compounds such as ammonia, ammonium sulfate, ammonium chloride, ammonium nitrate, ammonium carbonate, ammonium acetate, ammonium citrate, etc., nitrates, urea, or other compounds containing nitrogen, such as peptone, meat extract, yeast extract, cornsteep liquor, distillers solubles, casein hydrolysate, fish meal, bouillon, defatted soybean residue, chrysalis and the like may be employed. Mixtures of these substances may also be used. Furthermore, it is necessary to add to the culture medium certain nutrients for the growth of the bacteria such as amino acids, for example, methionine, etc., and/or vitamins, for example, cobalamin, etc. Inorganic compounds which may be added to the culture medium include potassium dihydrogen phosphate, potassium monohydrogen phosphate, magnesium sulfate, calcium carbonate, manganese sulfate, other salts of manganese and magnesium as well as salts of iron, cobalt, zinc, nickel and the like.

When ammonium sulfate is used as a nitrogen source, the addition of 1.5–2.5 percent thereof gives a very high accumulation of L-proline. In the case of ammonium chloride, the addition of 1.0–3.0 percent allows a high accumulation of L-proline.

As far as the inorganic substances in the culture medium are concerned, it has been found that the addition of more than 0.4 percent of $MgSO_4$ affects the amount of L-proline produced, as is shown in Table 1.

TABLE 1

| $MgSO_4$ Amount Added (%) | Amount of L-proline Produced (mg./ml.) |
|---|---|
| 0.05 | 0.1 |
| 0.40 | 3.1 |
| 0.60 | 5.5 |
| 0.80 | 6.4 |
| 1.0 | 7.5 |
| 1.4 | 8.0 |
| 1.6 | 6.9 |

The above experiment was carried out by culturing Micrococcus glutamicus ATCC No. 19,223 for 96 hours under aerobic conditions in a culture medium consisting of, by weight per liter of water, 12% glucose, 1.5% ammonium sulfate, 0.5% ammonium chloride, 0.75% yeast extract, 3% $CaCO_3$, 0.15% $KH_2PO_4$, 0.15% $K_2HPO_4$, 50 γ/l. of biotin as well as the amounts of $MgSO_4$ shown in Table 1.

The amount of biotin employed has no effect on the amount of L-proline.

Fermentation is carried out under aerobic conditions, such as aerobic shaking of the culture or stirring of a submerged culture with the introduction of air thereinto, at a temperature of about 23° to 37° C., preferably 26° to 32° C., and at a pH of about 5.0 to 6.5. If a pH of more than 7 is utilized, there is a tendency for the accumulated L-proline to disappear rapidly. Ammonia, sodium hydroxide, potassium hydroxide, calcium carbonate or calcium hydroxide may be used as the neutralizing agent for adjusting the pH of the medium. Furthermore, the addition of urea to the culture medium can be employed in order to supply ammonium ion to the medium as well as to adjust the pH thereof.

Culturing is generally carried out for 2–4 days, whereby L-proline is accumulated in the culture medium as the main product. After the completion of culturing, there is generally found to be produced in the culture medium about 1–2 mg./ml. of lysine, about 3 mg./ml. of alanine and less than about 1 mg./ml. of leucine as byproduct amino acids. Valine, glutamic acid and aspartic acid are also produced in slight amounts as byproducts. The production of lysine can be inhibited by using ammonium sulfate as a nitrogen source.

The culture liquor is filtered after the completion of culturing, adsorbed on a cationic ion exchange resin and eluted. The effluent is concentrated under reduced pressure and then dehydrated by the continuous addition of methanol thereto. The methanol solution is displaced by water after separating the amino acids which are only slightly soluble in methanol by filtration. The remaining small amounts of basic and acidic amino acids are removed by passing the water-displaced solution through columns of cationic and anionic ion exchange resins. Crude crystals of L-proline are then obtained by the dehydrating concentration of the effluent by the addition of methanol thereto, followed by concentrating to dryness under reduced pressure.

The following examples are given merely as illustrative of the present invention and are not to be considered as limiting. Unless otherwise noted, the percentages therein are by weight per liter of water.

EXAMPLE 1

Micrococcus glutamicus ATCC No. 19,223 is used as the seed bacterium. Two hundred ml. of a seed culture thereof is transplanted to a jar fermentor having a volume capacity of 5 liters. Then, 2 liters of a culture medium containing 12% of glucose, 2.0% of ammonium sulfate, 0.5% of ammonium chloride, 1.5% of $MgSO_4$, 0.75% of yeast extract, 0.15% of $KH_2PO_4$, 0.05% of $K_2HPO_4$, 50 γ/l. of biotin and 3.0% of $CaCO_3$ is charged into the fermentor.

Culturing is then carried out at 28° C. for 96 hours with an agitation of 450 r.p.m. and aeration of 2 liters per minute. The pH of the medium is adjusted to 5.8–6.0 with a 15 percent aqueous ammonia solution during the culturing. The amount of L-proline produced in the culture medium is 9.2 mg./ml.

After the completion of culturing, the pH is adjusted to about 2.0 with sulfuric acid and impurities are separated by filtration. The filtrate is passed through a column of cationic ion exchange resin of the sulfonic acid type for adsorption and is then eluted with aqueous ammonia. After concentrating about 0.5 liter of the effluent under reduced pressure, the amino acids which are only slightly soluble in methanol are eliminated as completely as possible by the continuous charging of methanol thereto to achieve dehydration and concentration. The methanol solution is again displaced with water and passed through a cationic exchange resin and then an anionic exchange resin. The effluent is again displaced with methanol after concentration, and the insoluble substances are separated by filtration. About 200 ml. of the methanol solution thus obtained is concentrated to dryness under reduced pressure. As a result, 13.5 grams of crude crystals of L-proline having a degree of purity of 85 percent is obtained.

EXAMPLE 2

Culturing is carried out with the same medium and under the same conditions as described in Example 1 except that Micrococcus glutamicus strain ATCC No. 19,224 is used as the seed bacterium. The culture liquor is found to contain 9.5 mg./ml. of L-proline. Treatment of the culture liquor as described in Example 1 yields 14.0 grams of crude crystals of L-proline having a degree of purity of 86 percent.

EXAMPLE 3

A fermentation is conducted under the same conditions and with the same medium as described in Example 1 except that 50 mg./l. of vitamin $B_{12}$ is added to the medium and that Micrococcus glutamicus ATCC No. 19,225 (methionine or vitamin $B_{12}$ requiring mutant) is used as the seed bacterium. The culture liquor is found to contain 9.8 mg./ml. of L-proline. Treatment thereof as described in Example 1 yields 14.5 grams of crude crystals of L-proline having a degree of purity of 86 percent.

The invention being thus described, it will be obvious that the same may be varied in many ways. Such variations are not to be regarded as a departure from the spirit and scope of the invention and all such modifications as would be obvious to one skilled in the art are intended to be included herein.

What we claim is:

1. A process for producing L-proline which comprises culturing a strain of Micrococcus glutamicus capable of producing L-proline and which requires at least one member selected from the group consisting of isoleucine, arginine, citrulline, ornithine, methionine and vitamin $B_{12}$ for its growth under aerobic conditions in an aqueous nutrient medium containing at least 0.4 percent by weight of magnesium sulfate, and accumulating L-proline in the resultant culture liquor.

2. The process of claim 1, wherein said nutrient medium contains an ammonium salt and at least one member selected from the group consisting of peptone, meat extract, yeast extract, cornsteep liquor, distillers solubles, casein hydrolysate, fish meal, bouillon, defatted soybean residue and chrysalis.

3. The process of claim 1, wherein said micro-organism is Micrococcus glutamicus ATCC 19,223.

4. The process of claim 1, wherein said micro-organism is Micrococcus glutamicus ATCC 19,224.

5. The process of claim 1, wherein said micro-organism is Micrococcus glutamicus ATCC 19,225.

6. A process for producing L-proline which comprises culturing a micro-organism selected from the group consisting of Micrococcus glutamicus ATCC 19,223, Micrococcus glutamicus ATCC 19,224 and Micrococcus glutamicus ATCC 19,225 under aerobic conditions at a temperature of from about 23° to 37° C. and at a pH of about 5.0 to 6.5 in an aqueous nutrient medium containing a carbohydrate, a nitrogen source and at least 0.4 percent by weight of magnesium sulfate, and accumulating L-proline in the resultant culture liquor.

7. The process of claim 6, wherein said nutrient medium contains an ammonium salt.

8. The process of claim 1, wherein the culturing is carried out at a temperature of from about 23° to 37° C. and at a pH of about 5.0 to 6.5.

9. The process of claim 1, wherein said nutrient medium contains an ammonium salt.

* * * * *